July 3, 1956  M. E. TOBY ET AL  2,752,968
MATERIAL ADVANCING AND SLICING MACHINE
Filed Nov. 10, 1952  7 Sheets-Sheet 3

INVENTORS
MAX E. TOBY &
VAO L. CHENEY
BY Gardner & Zimmerman
ATTORNEYS

July 3, 1956 M. E. TOBY ET AL 2,752,968
MATERIAL ADVANCING AND SLICING MACHINE
Filed Nov. 10, 1952 7 Sheets-Sheet 4

INVENTORS
MAX E. TOBY &
VAO L. CHENEY
BY Gardner & Zimmerman
ATTORNEYS

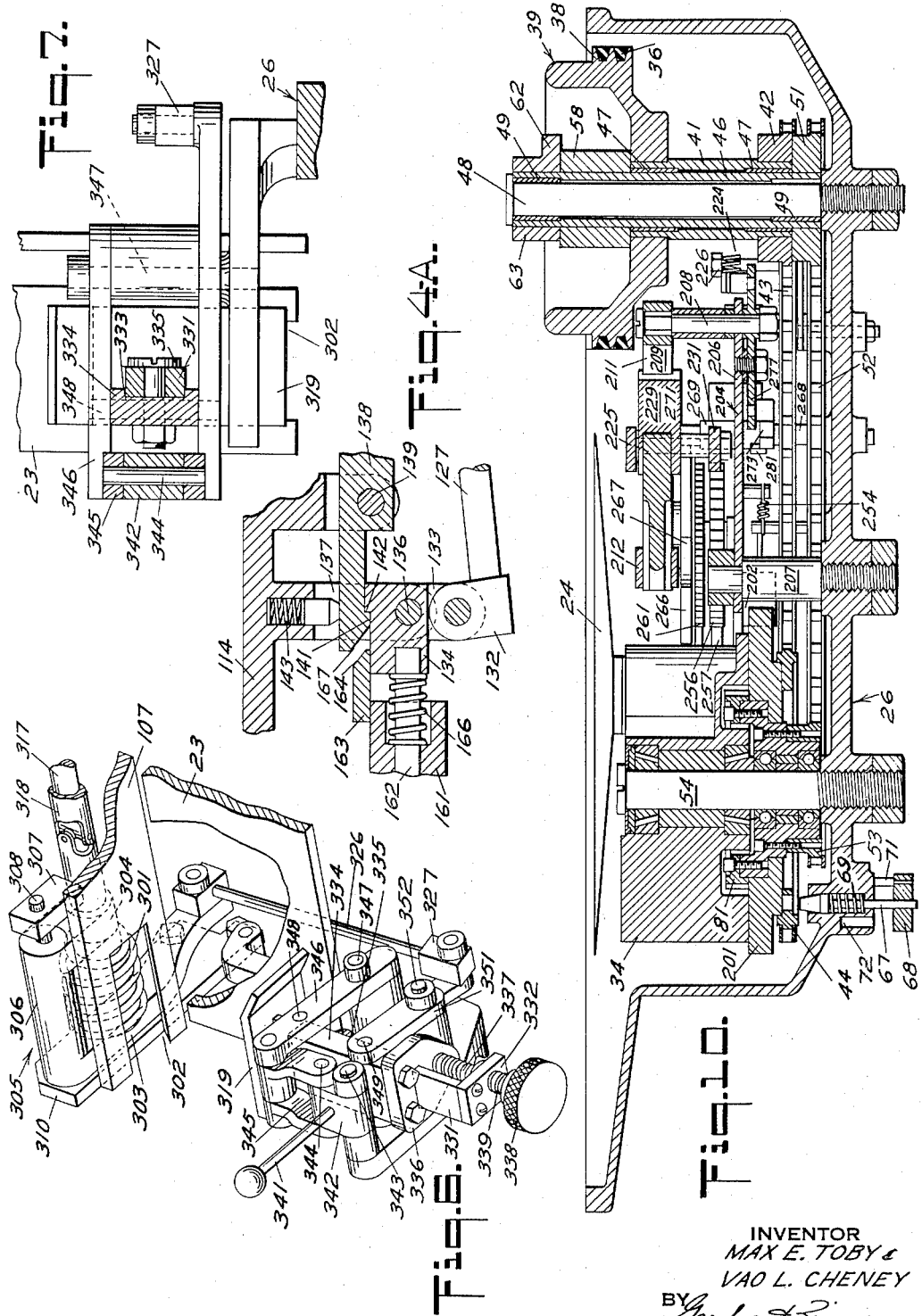

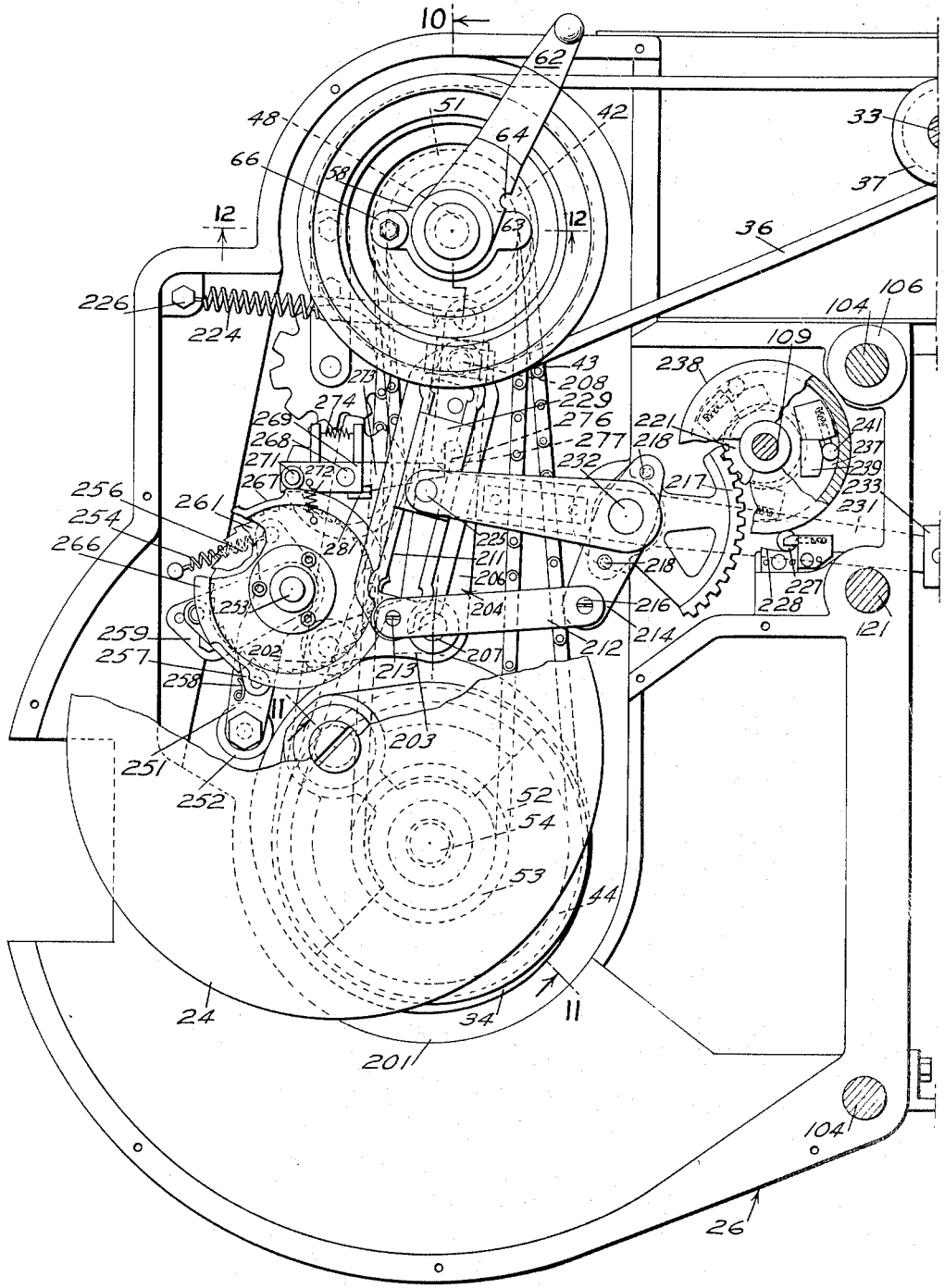

July 3, 1956     M. E. TOBY ET AL     2,752,968
MATERIAL ADVANCING AND SLICING MACHINE
Filed Nov. 10, 1952     7 Sheets-Sheet 7

INVENTORS
MAX E. TOBY &
VAO L. CHENEY
BY
ATTORNEYS

United States Patent Office 2,752,968
Patented July 3, 1956

2,752,968

MATERIAL ADVANCING AND SLICING MACHINE

Max E. Toby, San Francisco, and Vao L. Cheney, San Leandro, Calif., assignors to Package Enterprises, Inc., Oakland, Calif., a corporation of California Application November 10, 1952, Serial No. 319,652

14 Claims. (Cl. 146—94)

This invention relates to machines for slicing material, and is more particularly directed towards apparatus for producing slices of meat from a relatively large mass thereof.

An object of the present invention is to provide a meat slicing mechanism which is capable of producing meat slices having substantially identical weight and thickness characteristics.

Another object of our invention is to provide apparatus of the character described in which the thickness of the slices may be selectively varied when the machine is either in an operative or inoperative position.

A further object of this invention is to provide a slicer in which the degree of compressibility of the meat loaf will not affect the uniformity of produced slices.

A still further object of the invention is to provide a mechanism of the type referred to which will produce a larger number of slices per unit of time than is possible with existing slicing machines, and which is better balanced and more rugged than prior devices so as to increase the life thereof without undue maintenance or repair.

Yet another object of our invention is to provide a slicer of the above character in which a predetermined selected number of slices will be deposited in a vertically aligned stack for subsequent packaging or other operations without requiring further aligning of the individual slices.

Still another object of the invention is to provide slicing apparatus in which improved slice counting mechanism is utilized.

A further object of our invention is to provide, in apparatus of the type referred to, mechanism for positively feeding the meat loaf to the blade in measured increments of movement, and in which uniform slices may be made from the short end of the meat mass as well as from intermediate portions of the latter.

A still further object of this invention is to provide slicing apparatus including a generally disk-like slicer blade, in which means are provided for manually rotating said blade independently and separately from the normal drive mechanism, whereby such blade may be rotated for sharpening thereof and/or other rotatable associated members may be tested.

Another object of the invention is to provide means whereby the aforesaid slicer blade will vary its circumferential relationship to the meat mass as the blade is being rotated, thereby preventing excessive wear on any particular portion or portions of the blade.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 4A is a cross-sectional view taken substantially in the plane of line 4A—4A of Figure 4.

Figure 6 is a perspective view illustrating the details of construction of our auxiliary meat feed mechanism.

Figure 7 is a cross-sectional elevational view taken substantially in the plane indicated by line 7—7 of Figure 5.

Figure 8 is a view similar to Figure 5 illustrating portions of the drive mechanism, the plane of the view being generally represented by line 8—8 of Figure 1.

Figure 10 is a transverse cross-sectional view taken substantially in the plane indicated by line 10—10 of Figure 8.

In broad terms, the slicing apparatus of our invention is directed towards the intermittent type of meat slicers which are generally utilized for cutting a predetermined number of slices of luncheon meat or the like from a substantially solid loaf or mass thereof which is fed toward the slicing blade for a set number of revolutions of such blade, and then prevented from advancement so that the previously cut stack of slices may be manually or mechanically removed. As an example of this latter arrangement, attention is directed to the copending application of Max E. Toby, Serial No. 250,370, filed October 8, 1951, now Patent No. 2,708,539, issued May 17, 1955, for Apparatus and Method of Receiving and Bagging Articles, said application disclosing an apparatus arranged to receive a stack of slices from a slicing machine such as that which will be presently described.

Slicing machines of this intermittent variety usually include drive mechanism for rotating the slicing blade, meat feed mechanism for advancing the meat loaf towards the blade, and some suitable counting mechanism whereby the predetermined number of slices may be made. The apparatus of this invention constitutes a vast improvement over these major components of existing machines, and includes entirely new and different auxiliary arrangements whereby the hereinabove mentioned objects and features of advantage may be accomplished.

Figure 1:
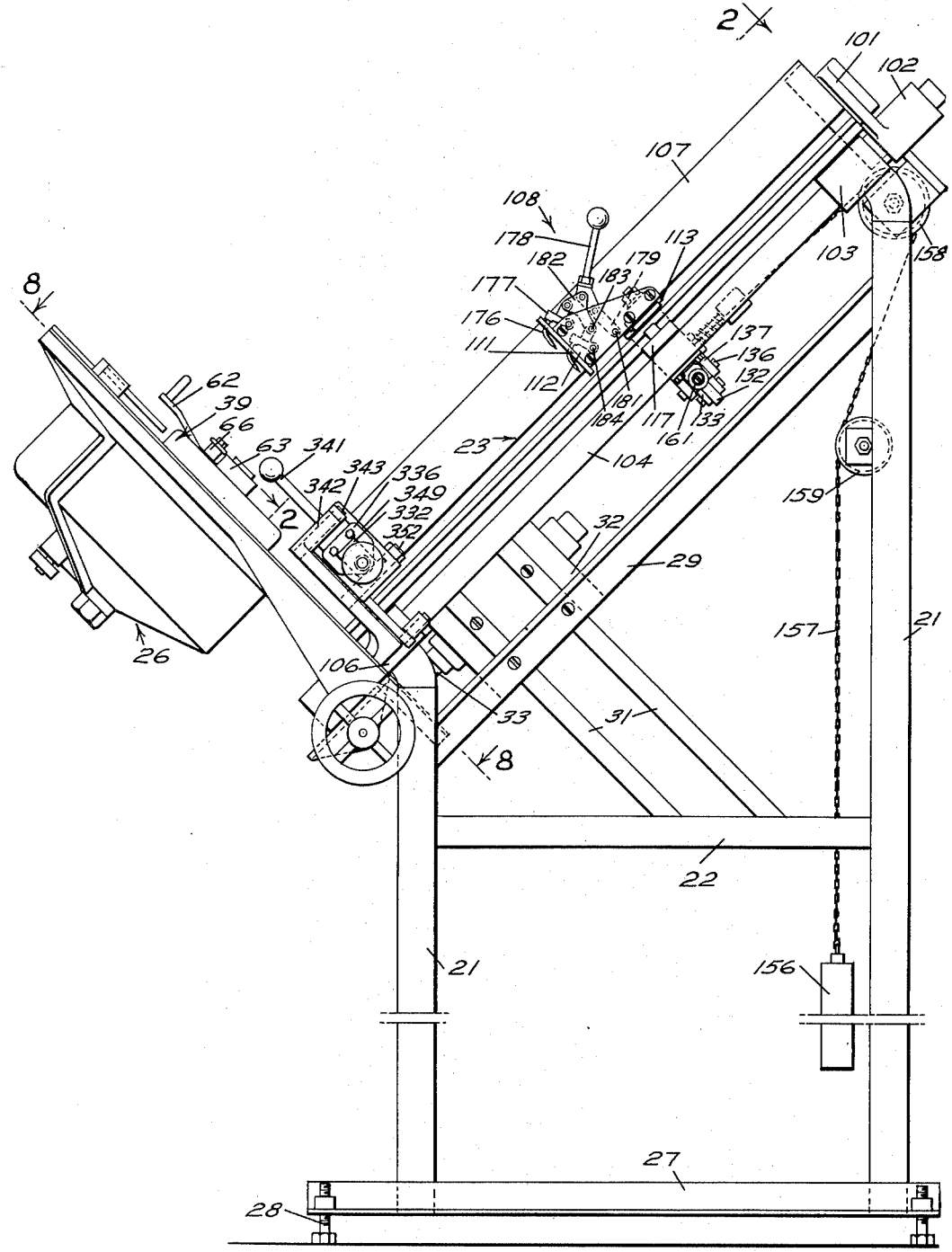
Figure 1 is a side elevational view of the slicing apparatus of our invention.

As here shown, and with particular reference to Figure 1 of the drawing, it will be seen that the slicer is arranged to be supported on a suitable framework including a plurality of spaced structural posts 21, such as angle irons, and transverse bracing 22. The two posts adjacent the front or slicing end of the machine (shown to the left in Figure 1) are substantially shorter than the two rear posts, whereby a meat supporting table 23 will be downwardly inclined towards the slicing mechanism. The slicing mechanism, including the slicer blade 24 is generally disposed in a housing 26 which is substantially perpendicular to the plane of table 23. As will be understood, table 23 is downwardly sloped towards the slicer blade to permit the meat loaf (not shown) to be assisted by gravitational forces to move towards the slicer blade. Adjacent the lower ends of posts 21 is a pair of horizontally extending braces 27 having horizontal flanges provided with suitable apertures through which levelling bolts 28 are inserted at the respective corners of the frame, so that the slicing mechanism may be selectively vertically positioned as well as to compensate for irregularities in the floor.

Suitably supported on the framework by rail members 29 and 31 is a motor 32 having its drive shaft 33 preferably disposed parallel to table 23, and as will be presently explained, this motor provides the power for actuating the various portions of our machine, including the slicer or cutter blade 24 and a rotating head or counterweight 34 with which the blade is operatively connected. The rotating head 34 and blade 24 are capable of independent rotation along different axes, but upon simultaneous rotation, the blade will follow an orbital path during its rotation upon its own axis and therefore inflict a slashing cut upon the meat loaf rather than a straight slicing cut.

Means are provided for interconnecting the head and blade with motor 32. The latter's power is carried off by means of one or more belts 36 which engage sheaves 37, secured to motor shaft 33, and sheaves 38 which are mounted on and secured to a combination flywheel and handwheel 39. Wheel 39 is secured to the front end of a sleeve 41 which is provided adjacent the rear end thereof with a sprocket 42. A chain 43 operatively connects sprocket 42 with a sprocket 44 which is secured to the rotating head 34. Sprocket 44 is approximately twice the size of sprocket 42 and thereby it will take approximately two complete revolutions of sprocket 42 to effect a single revolution of sprocket 44 and its associated head 34. Sleeve 41 and sprocket 42 are journalled for rotation on a blade drive sleeve 46, suitable annular bearings 47 being interposed between the respective sleeve members. In turn, sleeve 46 is journalled on a shaft 48, and capable of independent rotation relative thereto by means of bearings 49.

Mounted on the rear end of sleeve 46 is a sprocket 51, substantially identical to sprocket 42, and engageable with a blade drive chain 52, the latter also being engaged with a blade drive sprocket 53. With particular reference to Figure 10 of the drawings, it will be seen that sprocket 53 is rotatably mounted on a shaft 54, disposed in parallel spaced relation to wheel shaft 48, the shaft 54 being journalled in the rotating head 34.

Figures 11, 12:
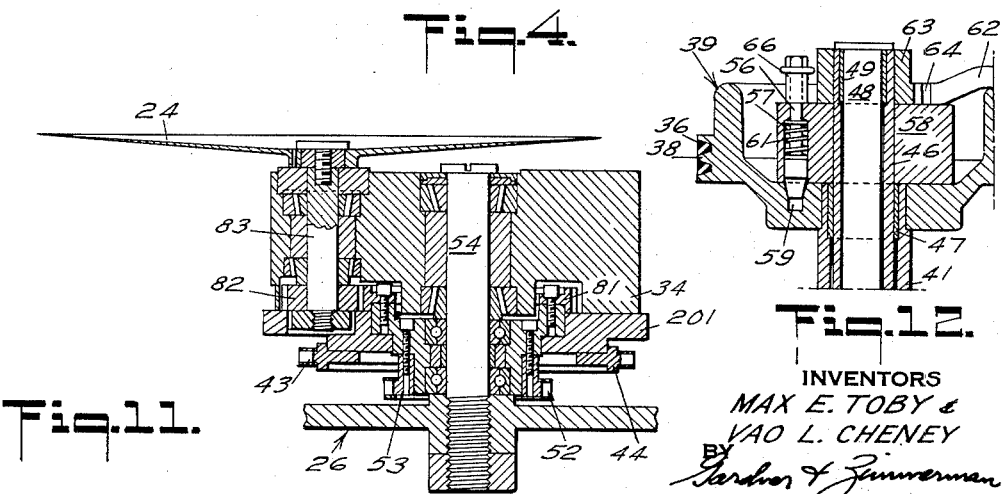
Figure 11 is a cross-sectional view of the slicer blade and associated parts of the drive mechanism, with the plane of the view generally designated by line 11—11 of Figure 8.
Figure 12 is a cross-sectional view taken substantially in the plane indicated by line 12—12 of Figure 8, illustrating portions of the rotating head and blade drive mechanism.
Figure 9:
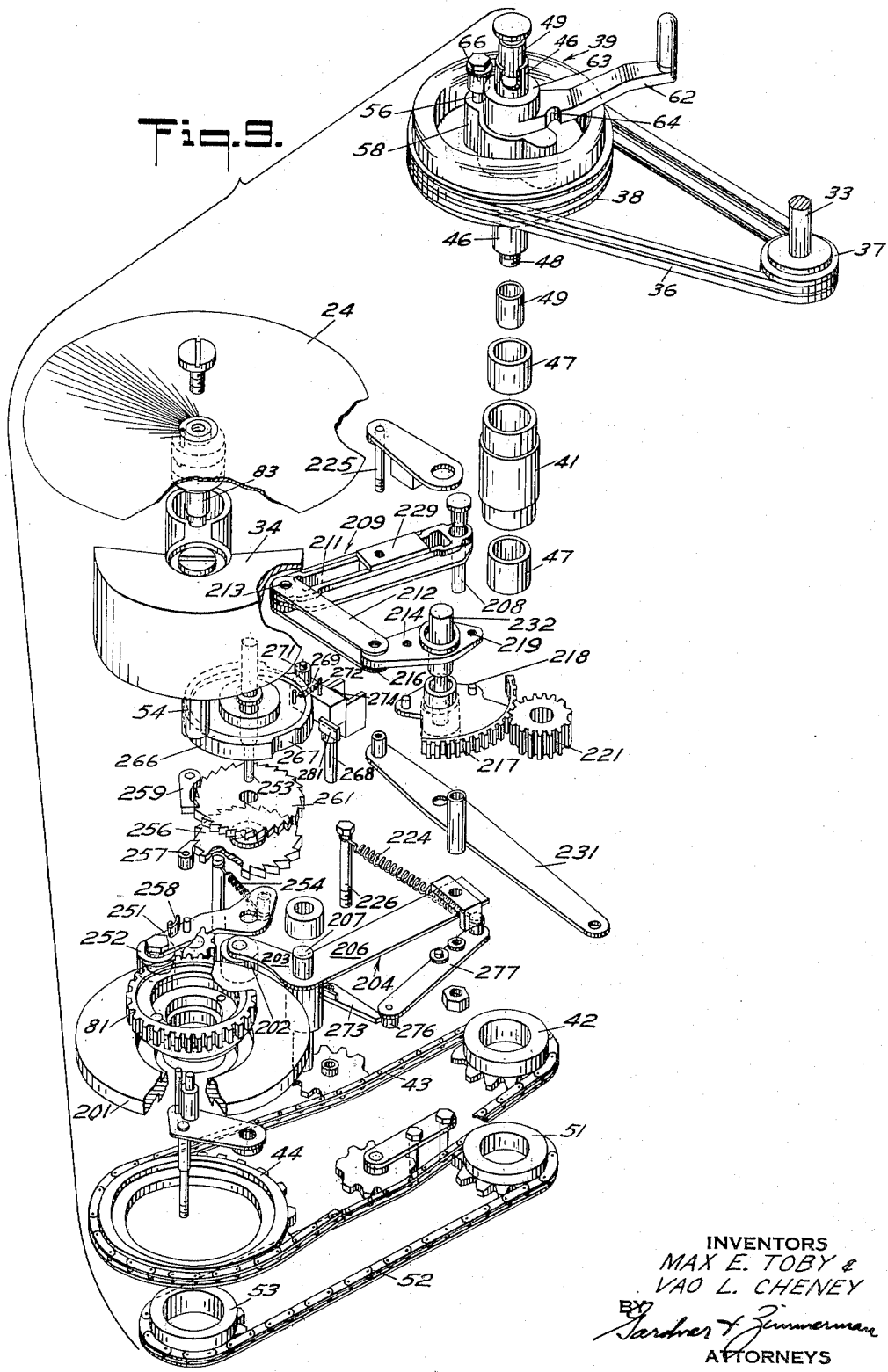
Figure 9 is an exploded perspective of portions of the drive and counting mechanism.

From the foregoing description, it will be understood that as sprockets 42 and 51 are independently rotatable about the shaft 48, and sprockets 44 and 53 are likewise independently journalled on shaft 54, the head 34 and cutter blade 24 may be separately rotated. However, in order to provide for simultaneous rotation, the sleeve 46 may be releasably connected to sleeve 41 by means of a pin 56, illustrated in Figure 12, which passes through an axially extending bore 57 provided in a hub member 58 secured to sleeve 46. One end of pin 56 is normally urged into engagement with a socket 59 provided in flywheel 39 by means of a spring 61, so that rotation of the flywheel will impart similar rotary movement not only to its sleeve 41, but also to sleeve 46, and consequently to each of the sprockets 42 and 51 and effect rotation of head 34 and blade 24. A handcrank 62 having a collar portion 63 may be telescopically engaged over sleeve member 46. This crank is used when it is desired to independently rotate the slicer blade 24 for sharpening, or for rotating head 34 for testing purposes. Crank 62 is provided with a slot 64 which in one direction of rotation is engageable with pin 56 when the latter is withdrawn against pressure of spring 61. It will be noted that pin 56 is provided with a radially enlarged portion 66 normally depressed by spring 61. By manually raising the pin, and rotating crank 62 in a clockwise direction as viewed in Figure 9, the slot 64 will engage pin 56 subjacent portion 66, thereby rotating sleeve 46, sprocket 51 and its operatively connected parts. Counter rotation of the crank will disengage the pin and crank slot and hub member 58 will rotate with the crank until pin 56 is again aligned with socket 59 in the flywheel, at which time both of the drive sprockets 42 and 51 will be rotated.

In connection with the above, attention is also directed to the fact that when it is necessary to independently rotate blade 24 for sharpening of the latter, or for other reasons, means are provided for locking head 34 against rotation. As best illustrated in Figure 10, housing 26 is provided with an aperture through which a plunger 67 extends at substantially right angles to the head drive sprocket 44. The plunger includes an outer knurled hand knob 68 at the outer end thereof and a spring 69 normally urges the other end thereof into engagement with a socket on sprocket 44. Knob 68 carries a short pin 71 generally parallel to plunger 67, and in one position of radial movement of the plunger, is engageable in a second housing aperture 72. During normal operation of the slicer, plunger 67 will be withdrawn from engagement with sprocket 44 and pin 71 will not be disposed in aperture 72, but will rather have its distal end in engagement with the outer surface of the housing. However, by rotating knob 68 until pin 71 is seated in aperture 72 and the plunger is engaged with sprocket 44, and by disengaging pin 56 from flywheel 39 in the manner previously discussed, the slicer blade may be independently rotated by movement of handcrank 62.

Blade rotation as just referred to is effected as follows. Rotation of sprocket 51 will cause sprocket 53 to be similarly rotated, the latter sprocket being fixed to a gear 81 which engages with a smaller gear 82, and gear 82 is fixed to a shaft 83 on which the slicer blade is mounted.

As hereinabove mentioned, the head 34 in which the blade shaft 83 is journalled is rotatable, and the blade shaft is likewise rotatable while the head is rotating, thereby producing a slashing cut on the meat loaf. In order to crystallize the foregoing discussion, this is accomplished in the following manner. When flywheel 39 is driven by belts 36 (or otherwise), and pin 56 is membered in the flywheel socket, the two drive sprockets 42 and 51 will be simultaneously rotated causing like rotation in the two driven sprockets 44 and 53. As sprocket 44 is connected to head 34, the latter will be rotated, and the blade 24 is rotated by sprocket 53 through gears 81, 82 and blade shaft 83. The cutter blade sprockets 51 and 53 are substantially the same size, while head sprocket 44 is approximately twice the size of sprocket 42. Thus, when sprocket 44 is rotated once, sprocket 53 will make approximately two revolutions. Also, gear 81 which is fixed to sprocket 53 is approximately three times as large as gear 82 which is secured to blade drive shaft 83. This will result in having the head 34 rotating positively once, with the blade drive sprocket 53 rotating positively twice, while the blade itself rotates absolutely negatively two times. This type of slicer mechanism may be referred to as a planetary slicer. The portion of the head spacing the planet gear shaft 83 from the sun gear shaft 54 is the arm of a planetary system. It is important to note that the gear ratio is not exactly three to 1, but rather some slightly different ratio so as to have a fixed spot on the blade periphery continuously advanced and thereby prevent the excessive wear on any portion of the blade which would normally occur by having the same portion continually come into contact with the meat loaf.

*Meat feed apparatus*

Figure 2:
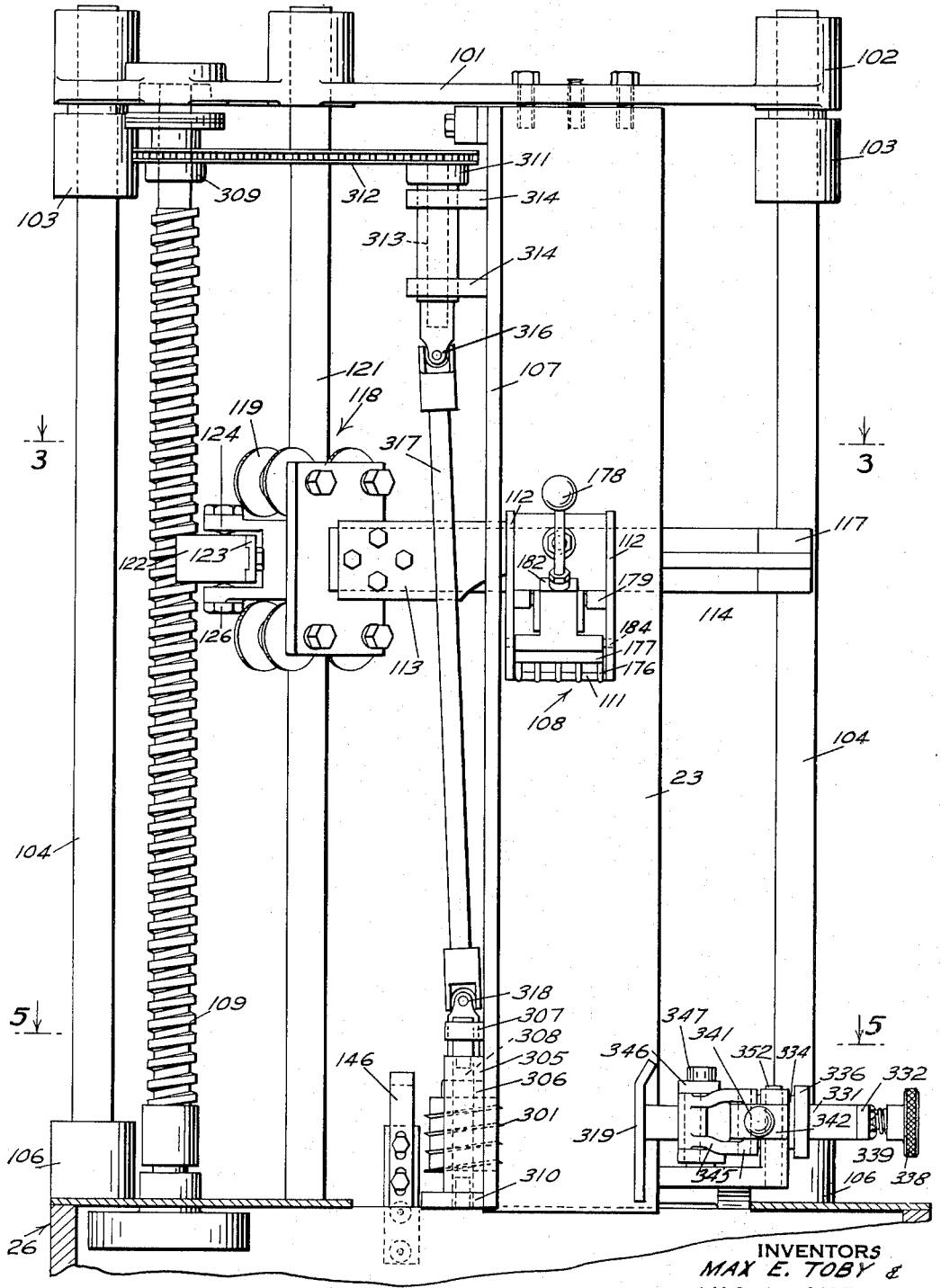
Figure 2 is a top plan view of a portion of the apparatus shown in Figure 1, the plane of the view being generally indicated by the line 2—2 of Figure 1.

As hereinabove stated, the meat loaf, or other object to be sliced, is arranged to be supported on the inclined table 23. Referring to Figures 1 and 2, it will be seen that the latter terminates at one end thereof adjacent the slicer blade 24, and as is conventional in the art, the housing 26 is provided with an opening through which the cut slices may fall. The other end of the table is secured to a transverse bracket 101 provided with sleeve-like members 102 at the distal ends thereof. Disposed in axial alignment with members 102 is a pair of similar sleeves 103, secured to the upper ends of the rear posts 21, and a pair of guide rods 104 extend through the aligned sleeves in general parallelism with table 23 and are mounted at their lower ends in collars 106 carried by the front posts, immediately adjacent lower portions of the housing 26.

Extending upwardly and spaced from table 23 adjacent an edge thereof, is a meat guide plate 107 which is arranged to intimately engage one side of the meat loaf as the latter is advanced towards the slicer blade. The loaf is initially controlled in its sliding movement along table 23 by a combination meat clamp and pusher member, generally indicated by the numeral 108, and best seen in Figures 1 to 4 of the drawings. In broad terms, member 108 is operatively connected to a lead screw 109 which is rotated by drive means which will be hereinafter explained. Thus, as the lead screw is rotated, member 108 will move the meat loaf towards the slicer blade, or the member may be disconnected from the lead screw to permit rearward movement of the member for insertion of a new meat loaf.

Figure 3:
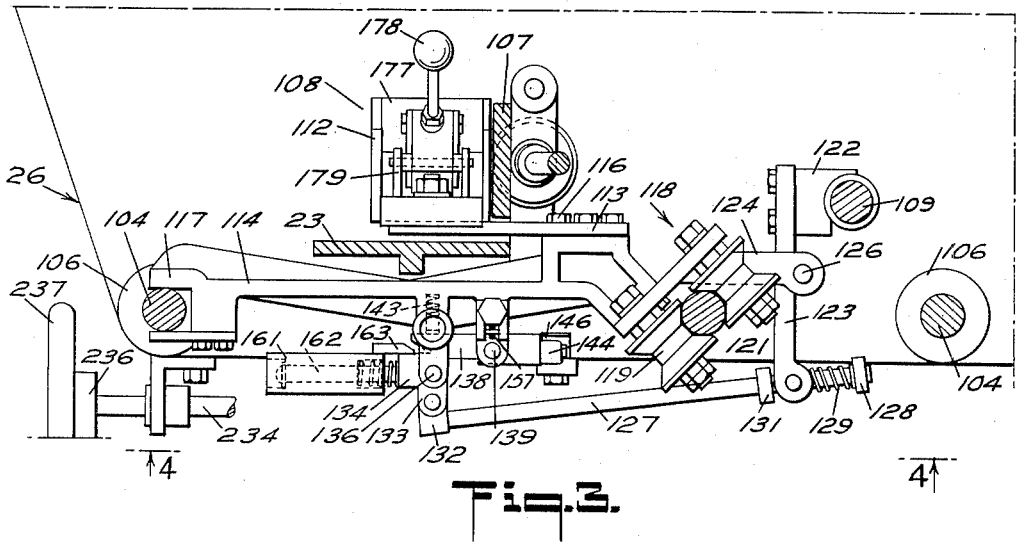
Figure 3 is a cross-sectional view taken substantially in the plane indicated by line 3—3 of Figure 2, and illustrating portions of the main meat feed mechanism.
Figure 4:
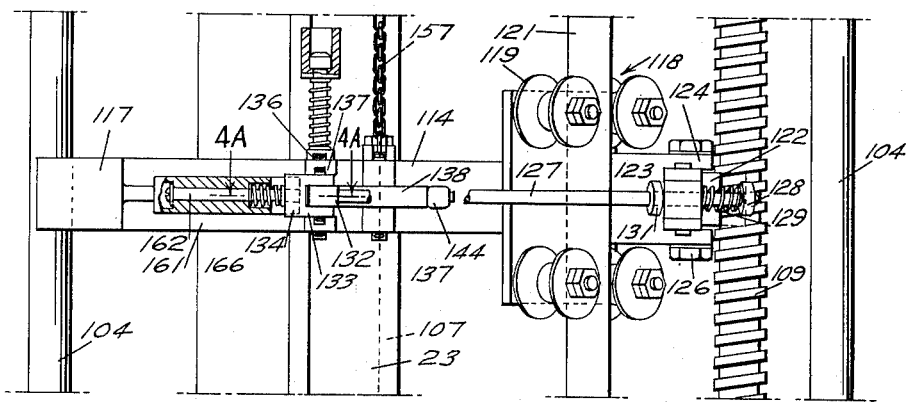
Figure 4 is a cross-sectional view taken substantially in the plane indicated by line 4—4 of Figure 3.

Member 108 is also provided with means for positively engaging the meat loaf so as to preserve contact therewith and prevent gravitational forces from accelerating the loaf towards the slicer blade. As here shown, member 108 includes a front plate 111 disposed generally perpendicular to table 23 and a pair of parallel spaced rearwardly extending side walls 112 secured to the respective vertical edges of the plate. Secured to the member 108 is a transverse bar 113 extending past one of the walls 112 thereof towards the lead screw 109. As is best illustrated in Figure 3, a support bar 114 is disposed subjacent table 23 in general parallel spaced relation to bar 113 and depends from the latter by means of bolts 116 or the like. The end of the bar 114 remote from the lead screw is provided with a yoke shaped extension 117 which is engaged with one of the guide rails 104 for sliding movement therealong. Also secured to bar 114 is a carriage 118 which carries a plurality of spools 119 having generally conical peripheral surfaces which rotatably engage an auxiliary guide rod 121, the latter extending from bracket 101 to housing 26. With this construction, it will be understood that member 108 is capable of longitudinal movement along table 23 and will be supported in slightly spaced relation to the table surface to avoid direct frictional contact therewith.

Means are provided on bar 114 for releasable operative engagement with lead screw 109. As above mentioned, when the meat loaf is being advanced towards the slicer blade, engagement of the member 108 with the rear end of the loaf will forcibly advance the latter. However, in order to rapidly move the member 108 to the rear of the machine to permit insertion of a new loaf requires a disengagement of the member with the lead screw. As here shown, such means includes a half nut 122 carried at one end of a rocking frame 123. Frame 123 is pivotally supported intermediate the ends thereof on spaced extensions 124 of the carriage 118 by means of a pair of pointed screws 126, and the other end thereof is journalled in a transversely extending link 127. One end of link 127 is provided with a collar 128, and disposed between said collar and frame 123 is a compression spring 129. A second collar 131 on the link on the other side of the frame normally retains the spring under compression and in the normal position of the link, a slight space exists between collar 131 and frame 123. The other end of link 127 is provided with an angularly disposed extension 132 journalled in a pair of spaced ears 133 which depend from a block 134. Block 134 is mounted for pivotal movement about a pin 136 carried by element 137 extending from bar 114. As will be best understood from viewing Figures 3 and 4A, if block 134 is permitted to rotate in a counter-clockwise direction, link 127 will be moved to the right causing frame 123 to rotate about its pivotal connection 126 and effect release of nut 122 with lead screw 109. Normally, such rotation is prevented by means of a lever 138 pivoted intermediate its ends on a pin 139 mounted on an extension of bar 114. On one end of lever 138 is a dog 141 engageable with a shoulder 142 on block 134. A spring 143 normally urges the dog into engagement with the shoulder and prevents rotation of the block. However, it is necessary to effect release of the nut 122 from the lead screw when the meat loaf is substantially entirely sliced. This is accomplished by providing a roller 144 on the end of lever 138 remote from the dog 141, such roller serving to rock the lever about its pivot 139 and release the dog from block 134 when it strikes a fixed stop member 146 secured to the housing 26. Upon such release, block 134 will tend to swing downwardly by gravitational force, and move link 127 to the right (as viewed in Figure 3) to its nut releasing position. When the nut is thus disengaged from the lead screw, means are provided for automatically returning member 108 to its uppermost position so as to facilitate the placing of a new loaf on the table. This is accomplished by means of a weight 156 secured to a chain 157, one end of the latter being attached to bar 114. Intermediate portions of the chain are engaged with pulleys 158 and 159, journalled on bracket 101 and on the support frame respectively. With this arrangement, when roller 144 hits stop member 146, member 108 will rapidly return to a rear position and the apparatus will be ready for the insertion of a new meat loaf.

On occasions, the operator of the apparatus may desire to effect release of the nut from the lead screw prior to the time that member 108 approaches the slicer blade. In view of this, there is provided a manual release which includes a handle 161 mounted on block 134 by means of a stud 162. The handle is provided with an extension 163 having a tapered cam surface 164 overlying a portion of block 134. Normally, the handle is maintained in an inoperative position by a spring 166, but by manually axially depressing the handle, cam surface 163 will engage a complementary surface 167 on dog 141, and force the latter from its seat on the block shoulder. Then the handle may be rotated with its associated block 134 to move link 127 and release the nut. Conversely, after roller 144 has struck stop member 146 or after the operator has deliberately disengaged lever 138 from the block, and the handle and block have, primarily under the influence of gravity, rotated to a position approximately 90° from the position illustrated in Figure 3, effecting release of nut 122, it will of course be necessary to reset the nut into engagement with lead screw 109. In practice, after a new meat loaf has been placed on table 23 with the front end of the loaf disposed immediately adjacent housing 26 and its associated slicer blade, the operator will move member 108 into engagement with the rear end of the meat loaf. Then, handle 161 will be upwardly rotated, preferably past the normal position shown in Figure 3, and manually held there until the action of link spring 129 forces nut 122 into engagement with the rotating lead screw. Handle 161 may then be released and the machine is in condition for further slicing operations.

The previously mentioned meat clamp means on member 108 includes a plurality of curvate tines 176 having sharpened points and preferably disposed in two vertically spaced horizontal rows. Each of said rows is carried by a bar 177 disposed rearwardly of plate 111, and the latter is provided with suitable apertures through which the tines may be extended to engage the meat or be retracted to be released from the meat loaf. To permit such insertion and withdrawal of the tines from the loaf portion adjacent plate 111, we utilize a manually engageable lever 178 pivotally connected to a link 179 which in turn is pivotally attached to member 108 by a pin 181. The link and lever provide a toggle to actuate a block 182 having one portion journalled on lever 178 and having two pivot pins 183 extending therethrough in engagement with angular extensions of each of the bars 177, the latter each being pivotally attached to side walls 112 of member 108 by means of pins 184. By rotating the lever 178 in a counter-clockwise direction as viewed in Figure 1, the bars and their associated tines will be rotated about their connections 184 and retract the tines, and by moving the lever in the other direction, the toggle joint will be re-established and the tines advanced to engage the meat loaf.

Mechanism for driving meat feed apparatus

The foregoing portion of the specification has dealt primarily with the details of construction of member 108 and how rotation of lead screw 109 imparts longitudinal movement to the member. We will now consider the mechanism which drives the lead screw, and the manner in which the thickness of the slices may be selectively varied by means of changing the number of degrees of rotation of the lead screw for each rotation of the slicer blade.

Secured to the rotating head or counterweight is a generally oval shaped cam 201 whose periphery is engaged by a roller 202 rotatably mounted at the distal end of the short arm 203 of a bell crank 204. The latter is also provided with an angularly extending long arm 206, and the bell crank may be pivoted about a shaft 207 disposed adjacent the intersection of the two arms thereof. Secured to the distal end of long arm 206 is a shaft 208 upon which one end of a rocker arm 209 is pivotally engaged. For a purpose to be hereinafter explained, it will be seen in Figure 9 that rocker arm 209 is preferably constructed with a longitudinally extending groove 211, but such groove need not be further discussed at this time. The other end of rocker arm 209 is disposed between a pair of substantially identical links 212 and is connected thereto by a stud 213. Also disposed between said links, adjacent the other end thereof is a lever 214, a stud 216 providing the connection therebetween. Movement of lever 214 is imparted to a segment gear 217 by means of a pair of short studs 218 mounted on gear 217 and engageable in matching apertures 219 of the lever. Segment gear 217 engages with and drives a pinion gear 221 which is secured to one face of a hubbed disk 237 which can freely rotate on one end of lead screw 109, while a clutch housing 238 is fixed to the lead screw end. Clutch wedges 239 are fixed to disk 237 so that by counterclockwise rotation of the disk, the wedges force spring-loaded rollers 241, or friction clicks, against the inner periphery of the overriding clutch housing 238, rotating the latter with the disk. Such a clutch may be called an infinite position ratchet as distinguished from a ratchet having a definite number of teeth.

With the foregoing construction, it is believed clear that upon rotation of head 34, cam 201 will oscillate roller 202, the latter being maintained in engagement with the cam periphery by means of a spring 224 having one end secured to the housing by a pin 226 and the other end attached to the bell crank arm 206. As arm 206 of the bell crank rises and falls, it forces rocker arm 209 to oscillate about its pivotal connection 225 effecting a similar oscillatory motion in segment gear 217 and pinion gear 221. In view of the fact that gear 221 is operatively engageable with clutch housing 238, the latter will be rotated in a counter-clockwise direction (as viewed in Figure 8) when bell crank arm 203 moves downwardly, but means are provided for holding the housing stationary when the bell crank moves upwardly. This is an important feature in view of the fact that if the lead screw 109 was rotated in both direction, the meat engaging member 108 would merely intermittently move forward and back along the table 23 instead of intermittently advancing the meat loaf. Such holding means includes a snub roller 227 engageable with the periphery of clutch housing 238. A concave element 228 is disposed on the other side of the roller and any clockwise rotation of the housing would bind roller 227 between element 228 and the housing and securely lock the latter. Also, when the rotation of pinion 221 is reversed, the rollers 241 are disengaged from the housing 238, and although disk 237 will rotate, the housing will remain stationary due to the action of the clutch wedges 239 and the snub roller 227.

From the foregoing discussion, it will be understood that lead screw 109 will be intermittently rotated in a single direction upon continuous rotation of the head 34, and such screw rotation will intermittently advance the meat loaf towards the slicer blade when the latter is in a position in its orbital path remote from the meat loaf.

In order to vary the thickness of the cut slices, means are provided for selectively changing the number of degrees of rotation of the lead screw 109 per revolution of head 34. The previously mentioned pivot shaft 225 of rocker arm 209 is arranged to be mounted in a pivot block 229 slidably engaged in groove 211 and capable of longitudinal movement relative to the rocker arm 209. Pivot 225 is fixed to the forked end of a lever 231 pivoted on a shaft 232. The end of lever 231 away from pivot 225 and block 229 is provided with a pivotally attached nut 233 which engages a screw 234 extending generally transversely of the housing 26, the screw being journalled in a bearing 236 depending from said housing and being provided with a manually engageable control knob 237 at the end thereof. Rotation of knob 237 will cause lever 231 to swing about its connection at 232 and the upper end of the lever will thereby change its position relative to shaft 208 which is fixed to bell crank 204. Similarly, pivot block 229 will be moved longitudinally of rocker arm 209, thereby changing the oscillating movement of stud 213 at the end of the rocker 209. This will result in either an increase or reduction in movement of link 212 and the oscillating motion of segment gear 217 and pinion gear 221 will be likewise changed. By increasing the number of degrees of rotation of said gears, the amount of rotation of lead screw 109 will also be increased, resulting in a larger advance of the meat clamp member per cutter blade rotation and consequently a thicker slice. Conversely, by decreasing the number of degrees by counter-rotation of knob 237, the reverse procedure takes place and thinner slices may be obtained. By reason of the foregoing construction, knob 237 may be actuated during the running of the machine so that the operator may readily change the thickness of the slices.

Counting mechanism

Slicers of the type to which the present invention relates are generally used in plants where a unit weight of slices are packaged for subsequent retail consumption. Thus, by adjusting the slice thickness, the weight may be determined by a preselceted number of slices.

In accordance with the teaching of this invention, means are provided in combination with the mechanism for driving the meat feed apparatus so that after a predetermined number of slices have been cut, the lead or feed screw will not be rotated while the slicer blade continues to rotate and move in its orbital path.

The previously discussed cam 201 is also used to oscillate a lever 251 by means of a roller 252 journalled at one end of the lever, the latter being mounted on a shaft 253. The other end of the lever is disposed on the other side of shaft 253, and by means of a tension spring 254 secured thereto, the roller 252 is maintained in engagement with the periphery of cam 201 to effect an oscillatory movement of lever 251. Also carried on shaft 253 is a ratchet wheel 256 disposed adjacent lever 251 and operatively connected thereto by means of a pawl 257 pivotally mounted on the lever and kept in engagement with the teeth of the ratchet wheel by means of a torsional spring 258. A second pawl 259 engages a ratchet wheel 261 secured to ratchet wheel 256 and prevents back travel or counterrotation thereof. Thus, upon each oscillation of lever 251, ratchet wheel 256 will be advanced one tooth.

Also secured to ratchet wheel 256 for rotation therewith on shaft 253 is a disk-like member 266 whose periphery is provided with one or more notched or cut out portions 267. Pivotally mounted on a shaft 268 is a frame 269, the latter rotatably supporting a roller 271 in intimate engagement with the periphery of disk 266, a spring 272 being utilized to insure continuous contact therebetween. A dog 273 is also pivotally mounted on shaft 268 and is operatively connected to frame 269 by means of a compression spring 274 which normally urges the dog in a clockwise direction as viewed in Figure 8. The distal end of dog 273 is disposed adjacent a stop post 276 extending from an auxiliary portion 277 of the bell crank long arm 206.

As the lever 251 oscillates, ratchet wheel 256 is intermittently advanced, and the latter will rotate disk 266 while roller 271 is pulled against the normal periphery of the disk and dog 273 will remain in its normal position indicated in Figure 8. However, when roller 271 is pulled into one of the notches 267 formed in the disk periphery, the dog 273 will be urged into a counterclockwise movement and will engage a side of the stop post 276. At this time, arm 203 has not yet reached its lowest position, which occurs when bell crank roller 202 is in contact with the highest point on cam 201. However, as soon as this point is reached, dog 273 will swing forward and roller 271 will drop into notch 267. It is believed clear that as long as the dog 273 engages the stop post 276, no rotary motion will be imparted to the gears 217 and 221, and consequently the lead screw 109 will likewise remain stationary, although the slicer blade and rotating head will continue in their respective rotations. The length of time that the lead screw is halted will of course depend on the peripheral length of notches 267, and it is believed clear that by computing the peripheral extent of disk 266 and the spacing and length of the notches, that the number of slices to be cut and the time interval elapsing between the slicing of successive stacks, or grooves, may be readily regulated.

After disk 266 has been rotated a number of degrees corresponding to the angular extent of notch 267, the roller 271 will be forced radially outwardly or in a clockwise direction as viewed in Figure 8. However, at this time, the high point of cam 201 will not yet have engaged roller 202 which is carried on the bell crank 203, and therefore, dog 273 will remain in its locked position through the exertion of spring 224 holding the bell crank stop pin against the end of dog 273. At this point, compression spring 274 will be in a collapsed condition. When the cam rotates to where its peak contacts roller 202, it will create a slight clearance between stop post 276 and dog 273, and spring 274 will force dog 273 in a clockwise rotation to clear the stop post and again permit normal oscillation of the bell crank and consequently the gears 217 and 221 and lead screw 109. Desirably, lugs 281 are also provided on frame 269 and dog 273 respectively, the said lugs permitting relative rotation between such members only in one direction.

From the foregoing discussion the features of construction and operation of the counting mechanism will be clear. However, as is the case with the other portions of our apparatus, various constructional details, such as bearings, attachments and the like have been purposely eliminated in the discussion as they form no independent part of our invention, and in any event are illustrated sufficiently to enable those skilled in the art to construct a slicing apparatus embodying this invention.

*Auxiliary feed mechanism*

Although this portion of the slicing apparatus is the last to be described and discussed, it constitutes one of the most important features of our invention. In slicing machines heretofore available, in spite of attempts to regulate the slice thickness, it has been found that it was impossible to produce uniformity of thickness during the slicing of a meat loaf. If the material being sliced consisted of a substantially rigid non-compressible material, no problem would result. However, a meat loaf is definitely compressible, particularly when it has a considerable length. Thus, even though the pusher member 108 may be positively moved during each rotation of the slicer blade, the forward portion of the meat loaf adjacent the slicer blade will not necessarily be advanced the same amount due to the longitudinal compression of the meat. Also, since the actual consistency of the meat may vary, and since the length of the meat loaf is constantly changing, the variations of movement between the rear and front portions of the loaf cannot be compensated for.

With the apparatus of the present invention, the foregoing difficulty is overcome by providing an auxiliary meat feed mechanism disposed substantially immediately adjacent the slicer blade 24 and arranged for synchronous movement with the main lead screw 109, and consequently with the main meat-engaging member 108. The details of construction of this mechanism are best seen in Figures 2, 5, 6 and 7 of the accompanying drawings.

Broadly speaking, the auxiliary feed mechanism includes a helical screw 301 having its axis disposed medially of guide plate 107 and generally parallel to the meat supporting table 23. The threads of screw 301 are quite thin and knife-like in form and are arranged to engage the side portion of the meat loaf adjacent guide plate 107 and for this reason plate 107 is provided with a cut out portion 302 through which the screw may extend and bury its threads into the meat. It is important to note that the lead of screw 301 is the same as that of the main lead screw 109, and thus, by rotating the screws 301 and 109 at the same speed, the front and rear portions of the meat will be simultaneously advanced without the danger of compressing the loaf.

To accomplish the foregoing similar rotations, the following structure is provided. Screw 301 is journalled between the parallel spaced arms 303 and 304 of a yoke-like member 305, the said arms terminating in a bar 306 which is pivotally secured to stationary lugs 307 and 310 by means of a pin 308. Secured to the rear end of lead screw 109 is a sprocket 309 which drives a duplicate sprocket 311 through a chain 312. The driven sprocket 311 is carried on a shaft 313 journalled in a pair of lugs 314 carried by plate 107. At the forward end of shaft 313, we provide a universal joint 316 and by means of a shaft 317 connected through another universal joint 318 to the shaft of screw 301, rotary movement of the lead screw will impart identical rotary movement to screw 301.

If the screw 301 could be located in a fixed radial position, there would be no need for the universal joints 316 and 318, and a rigid drive mechanism could be utilized. However, as will be presently explained, the auxiliary feed screw must be capable of transverse movement from and towards the plate opening so as to permit the placing of a new meat loaf on the table 23 and against the guide plate 107. It is likewise necessary to utilize a side pusher plate 319 which engages a side of the meat loaf opposite to the side engaged by guide plate 107 so as to urge the loaf into engagement with the screw 301.

Means are provided for effecting simultaneous movement of plate 319 and screw 301 either towards or away from each other so as to either selectively clamp the meat loaf therebetween or to release the loaf. As hereinabove stated, the bar 306 which carries screw 301 is pivotally mounted, and by rocking the same about pivot pin 308, the screw will swing inwardly towards the slot 302 or away from the same, with the pin serving as the center of rotation. The distal end of arm 303 is pivotally connected to one end of a link 326 whose other end is pivotally connected to a block 327 carried by the pusher plate support mechanism. It is believed clear that axial movement of said link will cause the yoke and screw 301 to swing in the previously described manner.

The front surface of the pusher plate is preferably provided with a plurality of longitudinally extending grooves or serrations 330 to provide more efficient contact with the meat loaf, and secured to the rear surface thereof is a bar 331 which terminates in an angularly extending lug 332, and which is slidably received in a groove 333 of a block-like frame member 334 and loosely connected thereto by a nut and bolt 335. Also mounted on member 334 is a second lug 336 disposed in parallel spaced relation to lug 332 and through which bar 331 slidably passes. Lug 336 is also provided with a tapped aperture to receive a screw 337 which has a manually engageable head 338 at the end thereof. By rotating head 338, the relative positioning of the plate 319 to accommodate the various sizes of meat loaves may be readily obtained. It will also be noted that a spring 339 is positioned between the screw head and lug 332 so that the pusher plate may be retracted in event a lateral projection on the meat loaf engages the same. In the absence of some such cushioning means, there would always be the possibility of jamming the meat loaf between plates 107 and 319.

To move the pusher plate and effect inward rotation of screw 301, a lever 341 is provided to actuate a toggle mechanism. Lever 341 is secured to one end of a link 342 rotatably mounted on a pin 343, and the other end is pivotally secured to the ends of a bifurcated link 345 by a pin 344. The other end of link 345 is pivotally attached to a yoked arm 346 which in turn is pivotally supported intermediate its ends on a fixed pin 347. Arm 346 is pivotally secured to frame member 334 by a pin 348. Also secured to the frame 334 by a pin 349 is a swinging yoke 351 on the fixed pivot 352, which yoke is in general parallelism to arm 346. Arm 346 carries the previously mentioned block 327 and is arranged to thus move the screw actuating link 326. It will be seen that the arm 346, yoke 351, and link 342 are pivotally fixed by pin 347, pin 352, and pin 343, respectively, such pins having their axes disposed in fixed spaced parallel horizontal position by being secured to a bracket 353 which is fastened to the housing 26.

Figure 5:
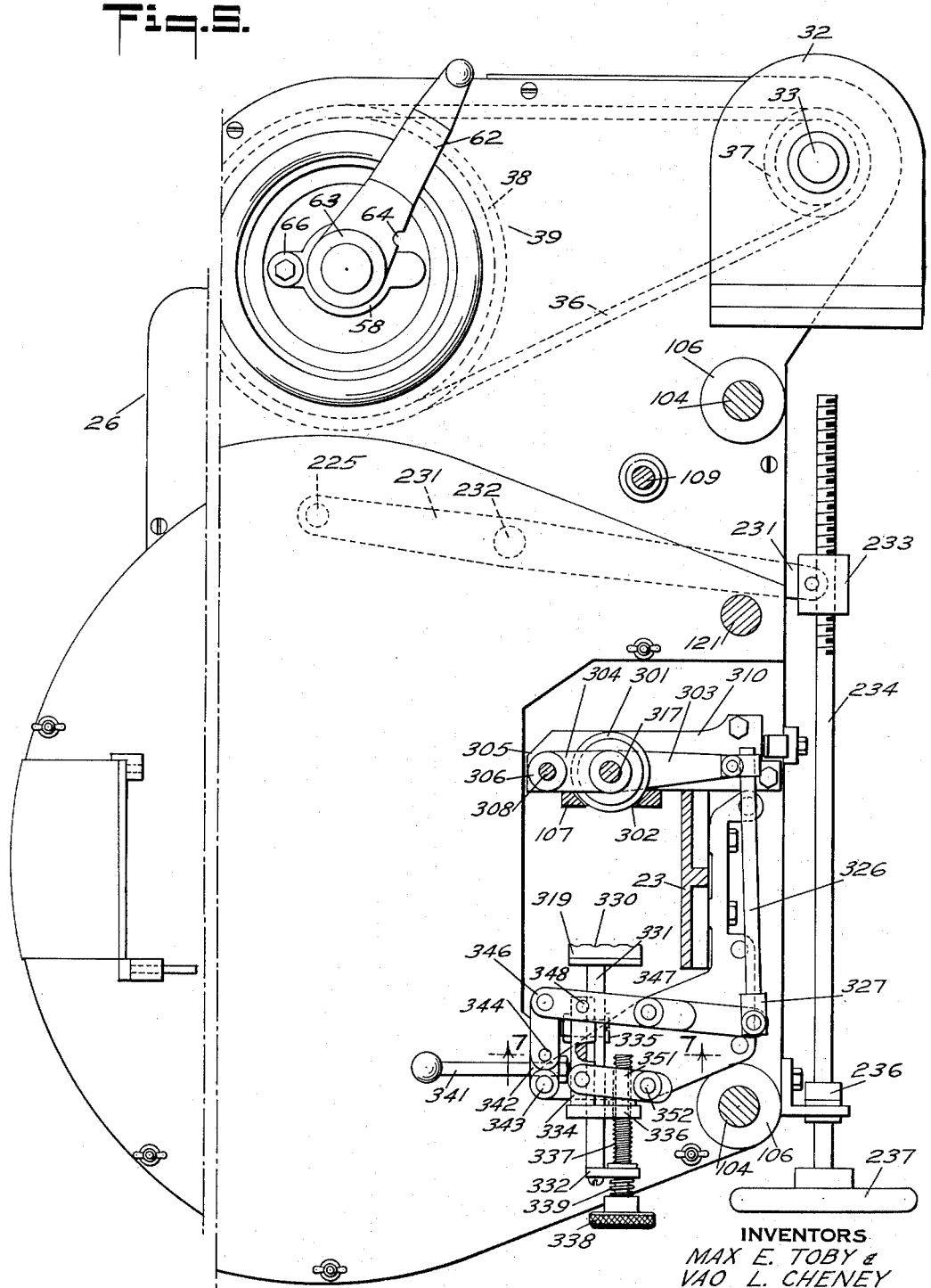
Figure 5 is an elevational view of the slicing end of the apparatus taken substantially along the plane 5—5 of Figure 2.

Thus, in operation, with lever 341 in a vertical position, as indicated in Figure 5 of the drawings, the toggle will be on, and plate 319 fixedly held in position as determined by the position of screw 337, such position of course being subject to change when transverse pressure is applied to the plate, causing a compression of spring 339. To release the toggle, lever 341 is rotated in a counter-clockwise direction, causing arms 346 and 351 to swing in parallel unison, and effecting a retraction of plate 319, while at the same time axially moving link 326 to swing screw 301 away from the guide plate opening 302.

While the toggle is open a new meat loaf may be placed in the machine, member 108 brought down to engage the rear end thereof, and toggle lever 341 moved to engage the opposite sides of the front end of the loaf. It should also be appreciated that by reason of the adjacent relationship between screw 301 and the slicer blade, that even after the meat loaf only has a very short portion remaining to be cut, the auxiliary feed screw and its opposed pusher plate will continue to properly advance the meat into position in the path of the slicer.

Conclusion

With the foregoing description, both the details of construction and mode of operation of the slicing apparatus should be obvious. It should also be appreciated that the construction permits ready disassembly of the parts for cleaning or other operations, and that the construction is sufficiently rugged so that the apparatus will be positively maintained in proper operative condition for extensive periods of time. Although an exemplary apparatus has been disclosed in the drawings and discussed herein, it is contemplated that persons skilled in the art may make various changes in the exact structure without departing from the scope and spirit of the invention as set forth in the following claims.

What is claimed is:

1. Apparatus for cutting slices from a mass of sliceable material including a longitudinally extending generally planar table on which said mass may be supported for longitudinal sliding movement therealong, a head member having an axis of rotation generally parallel to the plane of said table, means for rotating said head member, a circular cutter blade journalled on said head member in radially offset relation to said axis of rotation, means for rotating said blade independently of said head member, said blade being movable with said head member in an orbital path about said axis while independently rotating, mass clamp means disposed adjacent the upper surface of said table for longitudinal movement therealong, said clamp means including a pusher plate adapted to engage an end portion of said mass and an arcuate clamp, means for advancing said clamp means in synchronism with the rotation of said head member, a longitudinally extending screw feed disposed above said table adjacent said cutter blade and movable laterally of said table to selectively engage and release side portions of said mass, and means for moving said screw laterally of said table in a direction substantially normal to the axis of rotation thereof.

2. Slicing apparatus including a longitudinally extending and generally planar table on which may be supported for sliding movement a mass of material to be sliced, a head member, drive means for rotating said head member about an axis generally parallel to the plane of said table, a circular cutter blade including a shaft journalled on said head member in parallel spaced relation to the axis of the latter, drive means for rotating said cutter blade, said blade being movable with said head member in an orbital path about the axis of said head member, a mass-engaging member having a pusher plate disposal generally normal to the plane of said table, drive means operatively connecting said cutter blade drive means and said mass engaging member for moving the latter longitudinally along said table, a plate-like member adjacent said cutter blade extending generally normal to the plane of said table and arranged to engage side portions of the mass of material, and an auxiliary feed screw adjacent said cutter blade in opposed spaced relation to said plate-like member having an axis of rotation, substantially parallel to the plane of said table and adapted for engagement with opposite side portions of said mass of material for urging the latter through the plane of orbital movement of said blade.

3. In combination with a slicing machine having a longitudinally extending table on which a mass of sliceable material may be placed for sliding movement therealong and a cutter adjacent one end of said table movable in a plane generally normal to the plane of said table, material feed means disposed adjacent said cutter and said table and arranged to engage said material, said means including a screw positionable to engage side portions of material on said table having a longitudinally extending shaft substantially parallel to the plane of said table and the direction of movement of the material along said table, means for rotating said screw, and means extending upwardly from said table in parallel spaced relation to said screw for engaging the opposite side portions of the material, and means for selectively varying the spacing between said screw and said upwardly extending means.

4. Apparatus as set forth in claim 3 in which means are provided for moving said screw transversely of said table whereby said screw may be selectively engaged with and disengaged from the material on said table and may be positioned in selected spaced relationship to said parallel spaced means.

5. In a slicing machine having a cutter blade and a longitudinally extending table on which a mass of material to be sliced by said cutter may be placed for sliding movement therealong, a feed screw mounted adjacent a longitudinal edge of said table having a shaft substantially parallel to said edge and disposed upwardly from the plane of said table, means pivotally supporting said screw about an axis disposed in parallel spaced relation to said shaft whereby said screw may be selectively moved to a position overlying a portion of said table and to a position laterally removed therefrom, a pusher plate mounted adjacent the other longitudinal edge of said table in opposed relation to said screw with the plane of said plate substantially normal to the plane of said table, lever means for moving said plate laterally of said table, and link means operatively connecting said lever means and said pivotal supporting means whereby said screw and said plate may be selectively moved from and towards each other.

6. Apparatus set forth in claim 5 in which means are provided independent of said lever means for selectively moving said plate from and towards said screw, and resilient means on said plate permitting laterally outward displacement thereof when a pressure of predetermined force is applied to the surface of said plate.

7. A slicing machine comprising a longitudinally extending table on which may be supported for sliding movement therealong a mass of sliceable material, a cutter blade disposed in generally perpendicular relation to the plane of said table, drive means for rotating said blade, a lead screw extending substantially parallel to said table, means connecting said drive means and said lead screw for rotating the latter in timed relation to rotation of said cutter blade, a material engaging member engaged with said lead screw and including a pusher plate engageable with a rear end portion said material for urging the latter towards said blade upon rotation of said lead screw, a feed screw disposed adjacent said cutter blade including a shaft positioned generally parallel to the plane of said table, said screw having threads thereon engageable with side portions of said material means extending upwardly from the plane of said table in generally parallel spaced relation to said feed screw whereby said material may be clamped between said means and said screw, and drive means interposed between said lead screw and said shaft for driving said feed screw in synchronism with said material engaging member.

8. Slicing apparatus including a rotary head, a shaft supporting said head, a circular cutter blade having a shaft journalled for rotation on said head in parallel spaced relation to said head shaft, drive means for imparting independent rotation to said head and said blade, a lead screw, a member operatively connected to said lead screw and movable towards said cutter blade upon rotation of said screw, a cam mounted on said head member, means including a cam roller engageable with said cam, a segment gear mounted for reciprocating rocking movement connected to said latter means, clutch means operatively connecting said segment gear and said lead screw, and means on said clutch means permitting rotation of said lead screw in one direction of rotation and preventing counter-rotation thereof.

9. Slicing apparatus including a longitudinally extending table on which may be supported for sliding movement a mass of sliceable material, a rotary head member, a shaft disposed generally parallel to the plane of said table for supporting said head member, a circular cutter blade having a support shaft, means journaling said support shaft on said head member in spaced relation to said head member shaft, a cam mounted on said head member for rotation therewith, a lever pivotally supported intermediate the ends thereof, a segment gear secured to said lever, link means including a roller engageable with said cam and having a portion thereof pivotally attached to said lever for imparting reciprocating motion thereto, a pinion gear operatively engaged with said segment gear, a lead screw extending generally parallel to said table, means interconnecting said pinion gear and said lead screw, and means permitting only unidirectional rotation of said lead screw.

10. Slicing apparatus including a longitudinally extending table on which may be supported for sliding movement a mass of sliceable materal, a rotary head member, a shaft disposed generally parallel to the plane of said table for supporting said head member, a circular cutter blade having a support shaft, means journaling said support shaft on said head member in spaced relation to said head member shaft, a cam mounted on said head member for rotation therewith, a bell crank pivotally supported intermediate the ends thereof, a roller journaled on one end of said bell crank engageable with said cam, a rocker arm, means pivotally connecting one end of said rocker arm to the other end of said bell crank, a lever pivotally supported intermediate the ends thereof disposed substantially parallel to said rocker arm, a link pivotally engaged with the other end of said rocker arm and an end of said lever, a segment gear movable with said lever, a lead screw extending generally parallel to said table, and means interconnecting said segment gear and said lead screw for imparting rotation to the latter upon oscillation of said segment gear including a clutch having a gear thereon engageable with said segment gear.

11. Apparatus as set forth in claim 10 in which said rocker arm is provided with a pivot block slidably engaged therewith, and means for selectively positioning said block in said rocker arm whereby the movement of said lever and said gears may be selectively increased and decreased.

12. Apparatus as set forth in claim 10 including a ratchet wheel, a pivotally mounted arm having a cam follower in engagement with said cam and a pawl in operative engagement with said ratchet wheel, a disk-like member secured to said ratchet wheel and having a notch in the peripheral surface thereof, means including a roller in engagement with said peripheral surface, a stop arm carried by said latter means and movable in response to movement of said roller, said arm in one position of movement engaging a portion of said bell crank for locking the same and in another position of movement permitting the normal pivotal movement thereof.

13. In a slicing machine having a longitudinally extending table on which a mass of material may be placed for sliding movement therealong and a cutter adjacent an end of said table movable in a plane substantially normal to the plane of said table, a first plate-like member extending substantially normal to said table towards and adjacent said cutter, a second plate-like member disposed in substantial parallel spaced relation to said first member, said first member having a longitudinally extending slot therein, a material feed screw disposed adjacent said slot on the side of said first member opposite to said second member, means pivotally mounting said screw for movement from and towards said slot, and means for moving said second plate from and towards said first plate.

14. Apparatus as set forth in claim 13 including resilient means associated with said second plate-like member whereby the latter may be urged away from said first member upon the application of a force.

References Cited in the file of this patent

UNITED STATES PATENTS

| | | |
|---|---|---|
| 956,360 | Johnson | Apr. 26, 1910 |
| 1,289,516 | Mulder | Dec. 31, 1918 |
| 1,291,178 | Schaffer | Jan. 14, 1919 |
| 1,309,396 | Demuth | July 8, 1919 |
| 1,396,290 | Segschmeider | Nov. 21, 1921 |
| 1,400,698 | Stiles | Dec. 20, 1921 |
| 1,419,418 | Slayton | June 13, 1922 |
| 1,445,633 | Luschka | Feb. 20, 1923 |
| 1,557,893 | Stukart | Oct. 20, 1925 |
| 1,645,551 | Stukart | Oct. 18, 1927 |
| 1,825,421 | Roesch | Sept. 29, 1931 |
| 1,830,004 | Skoverski | Nov. 3, 1931 |
| 1,884,912 | Stukart | Oct. 25, 1932 |
| 1,941,519 | Van Berkel | Jan. 2, 1934 |
| 1,947,628 | Van Berkel | Feb. 20, 1934 |
| 1,950,530 | Walter | Mar. 13, 1934 |
| 1,976,823 | Mahler | Oct. 16, 1934 |
| 1,976,824 | Van Arndt | Oct. 16, 1934 |
| 1,991,304 | Walter | Feb. 12, 1935 |
| 2,045,481 | Mahler | June 23, 1936 |
| 2,047,399 | Walter | July 14, 1936 |
| 2,168,612 | Ahrndt | Aug. 8, 1939 |
| 2,347,818 | Folk | May 2, 1944 |